Oct. 3, 1961 T. S. SPRAGUE 3,002,347

METHOD AND APPARATUS FOR A BINARY FLUID POWER PLANT

Filed May 24, 1956

INVENTOR.
Theodore S. Sprague
BY
[signature] Moran
ATTORNEY

Oct. 3, 1961 T. S. SPRAGUE 3,002,347

METHOD AND APPARATUS FOR A BINARY FLUID POWER PLANT

Filed May 24, 1956 4 Sheets-Sheet 2

INVENTOR.
Theodore S. Sprague
BY
J. P. Moran
ATTORNEY

Oct. 3, 1961 T. S. SPRAGUE 3,002,347

METHOD AND APPARATUS FOR A BINARY FLUID POWER PLANT

Filed May 24, 1956 4 Sheets-Sheet 3

INVENTOR.
Theodore S. Sprague
BY
ATTORNEY

METHOD AND APPARATUS FOR A BINARY FLUID POWER PLANT
Filed May 24, 1956 4 Sheets-Sheet 4
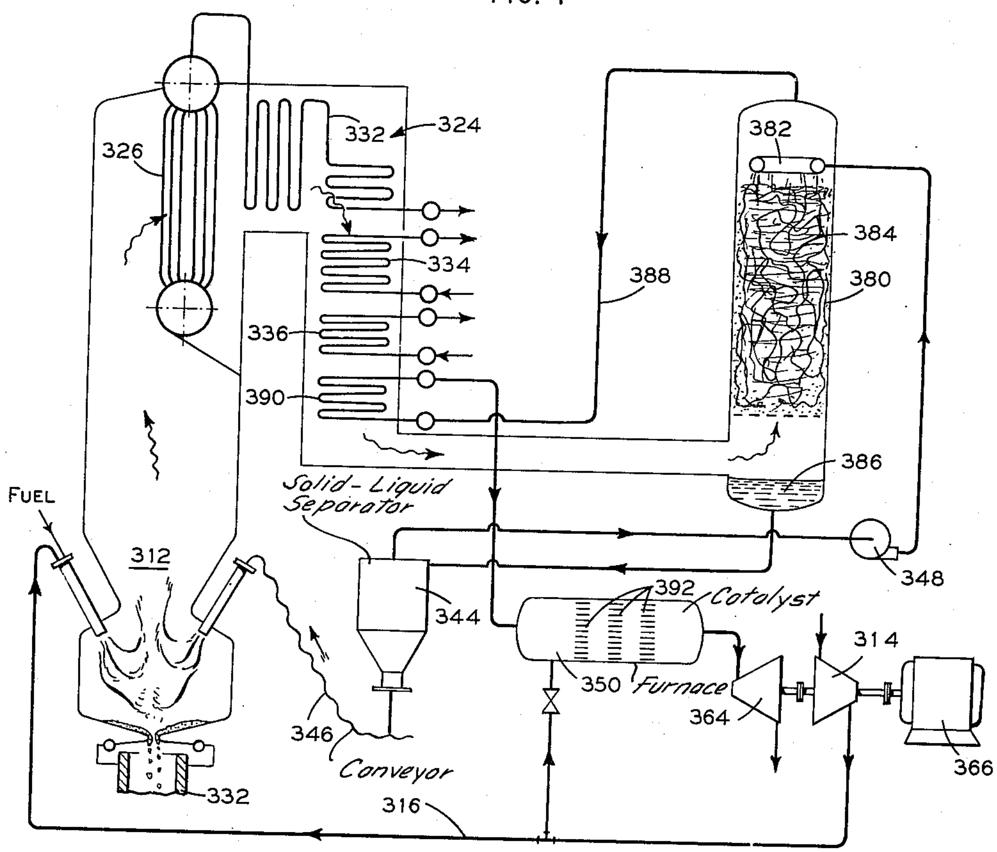
INVENTOR.
Theodore S. Sprague
BY
[signature]
ATTORNEY United States Patent Office 3,002,347

Patented Oct. 3, 1961

3,002,347

METHOD AND APPARATUS FOR A BINARY FLUID POWER PLANT

Theodore S. Sprague, Hewlett, N.Y., assignor to The Babcock & Wilcox Company, New York, N.Y., a corporation of New Jersey Filed May 24, 1956, Ser. No. 587,005
23 Claims. (Cl. 60—39.12)

This invention relates in general to a method and apparatus for a binary fluid power cycle, and more particularly, to a power cycle in which there is a gas turbine cycle imposed on a vapor cycle.

Gas turbine power plants are presently limited in practical operation to a few units in which the fuel, when burned, produces a clean high temperature gas. Thus, most of these turbines burn gaseous or high distillate fuels, for example, gasoline, kerosene or diesel oil, all of which may be burned to produce a gas free of gas-carried solids and/or inorganic vaporized reaction products. In experimental units attempts have been made to use an ash-forming fuel, such as coal or heavy distillate oils. The products of combustion resulting from the burning of these fuels contain unburned carbon, small ash particles, gaseous sulphur dioxide, trioxide, and inorganic vaporized ash including alkalies and oxides of rare metals. All of these aforementioned products of the combustion process have been identified in the gases and contribute to unsatisfactory service life of the gas turbine. Experimental turbines running on the solid or heavy oil fuels have experienced excessive erosion, corrosion and deposition which results in limiting the operating temperatures of the turbines to uneconomic low values. For instance, in stationary service 1500 F. is considered to be about the maximum sustained operating gas temperature.

Gas turbine cycle efficiency is primarily a function of turbine inlet gas temperature and with 1500 F., the simple gas turbine cycle has an efficiency below that of a diesel engine. However, a few hundred degree rise of turbine inlet temperature will produce a vastly improved cycle efficiency. Within the limits of the present metals, gas turbines would be able to effectively operate at higher temperatures if the erosion, corrosion, and deposition of combustion produced products could be eliminated.

Many arrangements have been tried to produce a power cycle having a high efficiency. The most common is to superimpose a gas turbine cycle on a steam cycle whereby the advantages of both cycles result in a power cycle which is practicable and has a thermal efficiency somewhat greater than that of the steam alone. This is so because the rejected heat of the gas turbine is utilized in the steam cycle, thus in effect making the gas turbine system approach ideal efficiency. The utilization of the combined cycle would become more attractive if the gas turbine cycle could be made to contribute a greater percentage of the power extracted. From the aforementioned discussion one of the most desirable ways to increase the power contribution of the gas turbine is to increase its inlet gas temperature. However, to do this the restraining problems of turbine erosion, corrosion and deposition must be solved.

The deleterious effects in the turbines of the combustion products also create difficulties in the operation of vapor generating units associated with the combined or binary fluid cycles. High temperature metal surfaces appear to be particularly vulnerable to erosion, corrosion and deposition from the inorganic combustion products carried by the gas. It has been determined that high temperature metal parts will last longer in a clean gas atmosphere than in a normal combustion products gas stream from the burning of coal and heavy oil. Accordingly, it is most desirable to find a way of cleaning the gas. Additionally, the design of combustion heated steam generating units is largely dictated by having to provide for the deleterious effects of the gas carried attacking products. For instance, heat transfer tubular elements must be spaced at fairly wide distances from each other to prevent slag and/or condensed alkali products from bridging over between the tubes and blocking the gas path. Thus if the gas could be cleaned, the tubes would be placed closer together, the heat transfer rate would be improved, and the quantity of tubes necessary to produce a given heat absorption would be considerably reduced. It follows that the size of and therefore the cost of the apparatus would be materially decreased. Also, a clean gas would allow present metals to be used at higher temperatures and thus greater cycle efficiencies could be obtained when using the presently known metals.

In both steam and gas thermal cycles, the efficiency can be increased under the proper conditions by reheating the fluid after it has gone through a partial expansion. The factors which limit the reheat are the initial pressure and temperature of the gas or steam prior to its first expansion and generally more stages of reheat can be added as the initial temperature and pressure rises. From a practical standpoint, however, materials of engineering limit these pressures and temperatures, but any material may be used under higher pressure and temperature conditions if you can eliminate erosion and corrosion. Thus, the provision of clean gases allows multiple steam and gas reheat and results in efficiences much higher than available today.

Accordingly, the present invention provides an elastic fluid power cycle in which clean gas is produced by first gasifying the fuel and producing a combustible gas having entrained or carried vaporized and solid inorganic products. This gasification step is carried out at a high temperature and the gases are then subsequently cooled in a heat transfer zone to a temperature where substantially all of the vaporized ash particles are condensed. The cool combustible gas is then passed into a gas cleaning zone where the condensed ash and entrained solids are separated. The clean combustible gases then pass into a second combustion zone where they are mixed with a free oxygen-containing gas and burned to complete combustion and produce a clean high temperature gas. This gas is then delivered at a predetermined temperature to a power extraction expansion zone where the heat is usefully extracted.

Additionally, the invention provides that the gasified products be cooled by generating and superheating vapor which in turn is delivered to a vapor power extraction expansion devices so that there is a steam cycle imposed on a gas turbine cycle.

Further, the invention contemplates cooling the gasified dirty gases by generating and superheating vapor and completing the heating of the vapor to a high temperature in a gas cooling zone downstream from the second reaction zone whereby the highest metal temperature associated with the steam cycle is in a clean gas atmosphere to provide a most compact and effectively utilized heat transfer apparatus.

The invention further contemplates multi-stage steam reheating by the gasified products with the final stages of the vapor heating being done by the clean fully burned gas products so that there is provided a maximum efficiency steam cycle superimposed on a high temperature gas turbine cycle.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which I have illustrated and described preferred embodiments of the invention.

In the drawings:

FIG. 1 schematically shows a preferred embodiment of a combined elastic fluid power cycle.

FIG. 4 is a third alternative showing of a combined fluid power cycle.

Figure 1:
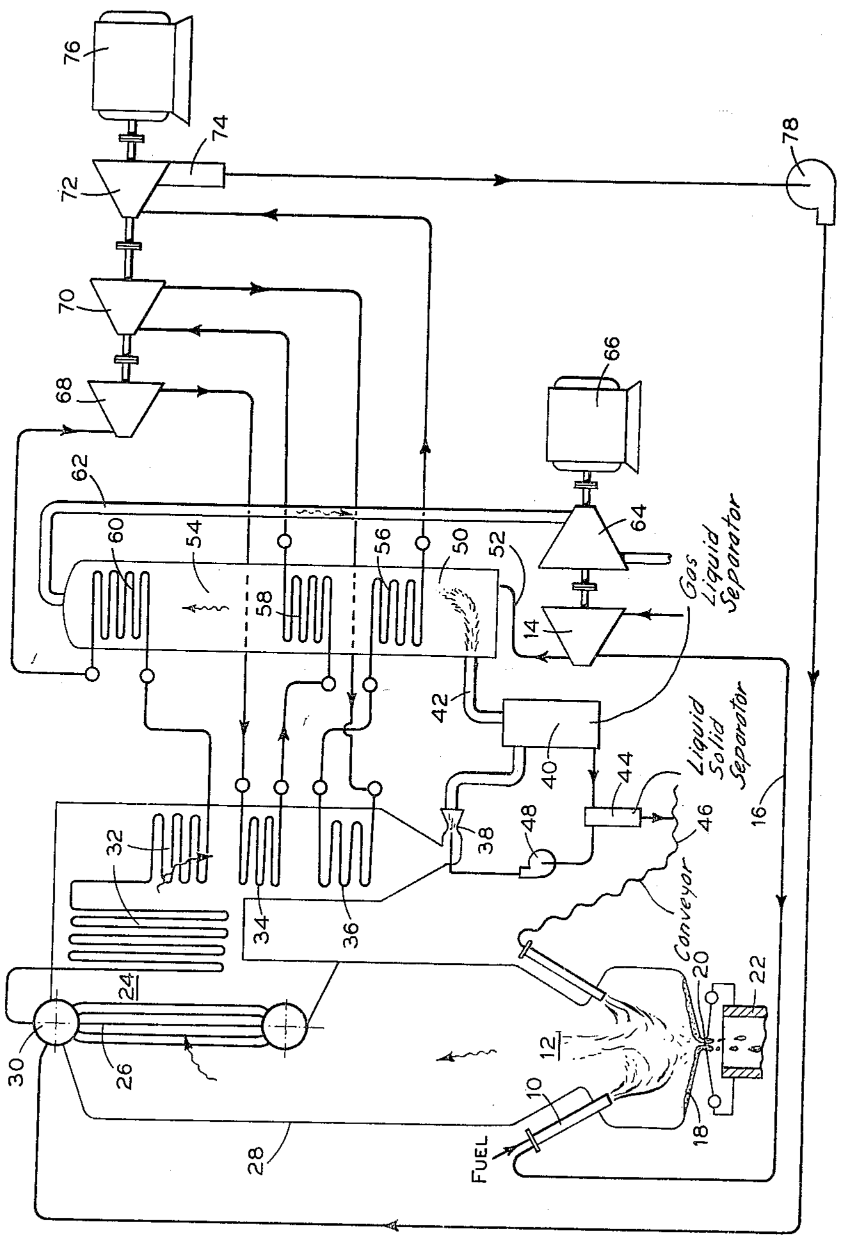

In the power cycle of FIG. 1, a slag forming fuel is passed in by a burner 10 to a furnace chamber 12. Simultaneously a free oxygen-containing gas, such as air at superatmospheric pressure, is passed into the furnace 12 by the burner arrangement 10 in a fuel to oxygen ratio insufficient for complete combustion, the air being supplied from a compressor 14 via line 16. The fuel and oxygen-containing gas reacts in the furnace and the fuel is partially burned at a temperature above its ash fusion temperature in the order of 2500 to 3000° F., and produces a combustible gas, heavy in carbon monoxide. Such a step is normally called fuel gasification. The arrangement of the furnace 12 and the position of the burner 10 cause the molten slag from the combustion process to separate from the gas and accumulate on the floor 18 of the furnace. The slag is withdrawn through the tap hole 20 into a lower slag tank 22 where it is collected for removal. The combustible gaseous products contain gas carried solids, such as unburned carbon, solidified or semi-molten slag, sulphur oxides and vaporized ash products, such as alkalies and rare metal oxides. The gas flows upwardly through the furnace into a gas pass 24 wherein it is cooled to a temperature whereby substantially all of the vaporized ash products will condense. This cooling is accomplished by heat transfer service in the form of a tube bank 26 and radiant wall tubes 28 wherein steam is generated and delivered to an upper drum 30. The steam then goes into a primary or low vapor temperature superheater 32 where it is further heated. The gas while flowing in the gas pass 24 passes over a low vapor temperature first reheater 34 and then over a low vapor temperature second reheater 36 before passing out of the gas pass. At the exit from the gas pass the gas is accelerated in a venturi 38 at which time a washing liquid, such as water, is sprayed into the gas to completely wash the gas and entrain all of the ash and unburned solid products contained therein. The gas and water mixture then passes into a gas-water separator 40 wherein clean gas passes out the line 42, and the water and ash products pass into a liquid-solid separator 44. In this separator 44 the ash products are removed from the liquid with the ash products passing to a conveying means 46 and the liquid passing to the suction of a recirculating pump 48 for the recycling of the washing process liquid. The conveying means 46 returns the ash and solid particles to the furnace 12 where the carbon particles have an opportunity to burn and the ash is caught in the molten ash of the furnace and removed therewith.

The clean combustible gas in line 42 passes into a second reaction zone or furnace 50. There it is mixed with a free oxygen-containing gas or air at superatmospheric pressure supplied by the line 52 from the compressor 14. This air or free oxygen-containing gas is supplied in a fuel-oxygen ratio sufficient to cause complete combustion in the reaction zone 50 and produce a clean high temperature gas. A second gas cooling pass 54 opens into the furnace 50 for the flow of the clean gas therein. The clean gas is progressively cooled to a predetermined delivery temperature by a high vapor temperature portion 56 of the second reheater, the high vapor temperature portion of the first reheater 58 and the high temperature or secondary portion 60 of the superheater. The gas leaving the pass 54 is delivered to the outlet line 62. This predetermined temperature gas is then put into a power extracting expansion device or gas turbine 64 from which the gas is exhausted from the cycle. This gas turbine 64 is arranged to drive the compressor 14 and any excessive power is absorbed by an electric generator 66.

The predominant amount of power developed in the cycle is produced from the reheat steam cycle wherein a high pressure turbine 68 is driven by the superheated steam coming from the secondary superheater 60. The exhaust from the high pressure turbine passes into the low temperature portion 34 of the first reheater and thence into the high temperature portion 58 where it is heated to its final predetermined temperature and thence passes into an intermediary pressure turbine 70 where power is extracted by expansion. The exhaust steam from the intermediate pressure turbine passes to the low temperature portion 36 of the secondary reheater and thence into the high temperature portion 56 of the secondary reheater from which it discharges to the inlet of a low pressure turbine 72. In the turbine 72 the steam is expanded while work is being extracted and the exhausted steam is sent into the condenser 74. The turbines are shown all by way of example as connected to a single shaft which drives an electrical generator 76. The exhaust steam is condensed in the condenser 74 and the pump 78 takes this condensate and pumps it back to the steam generator.

Figure 2:
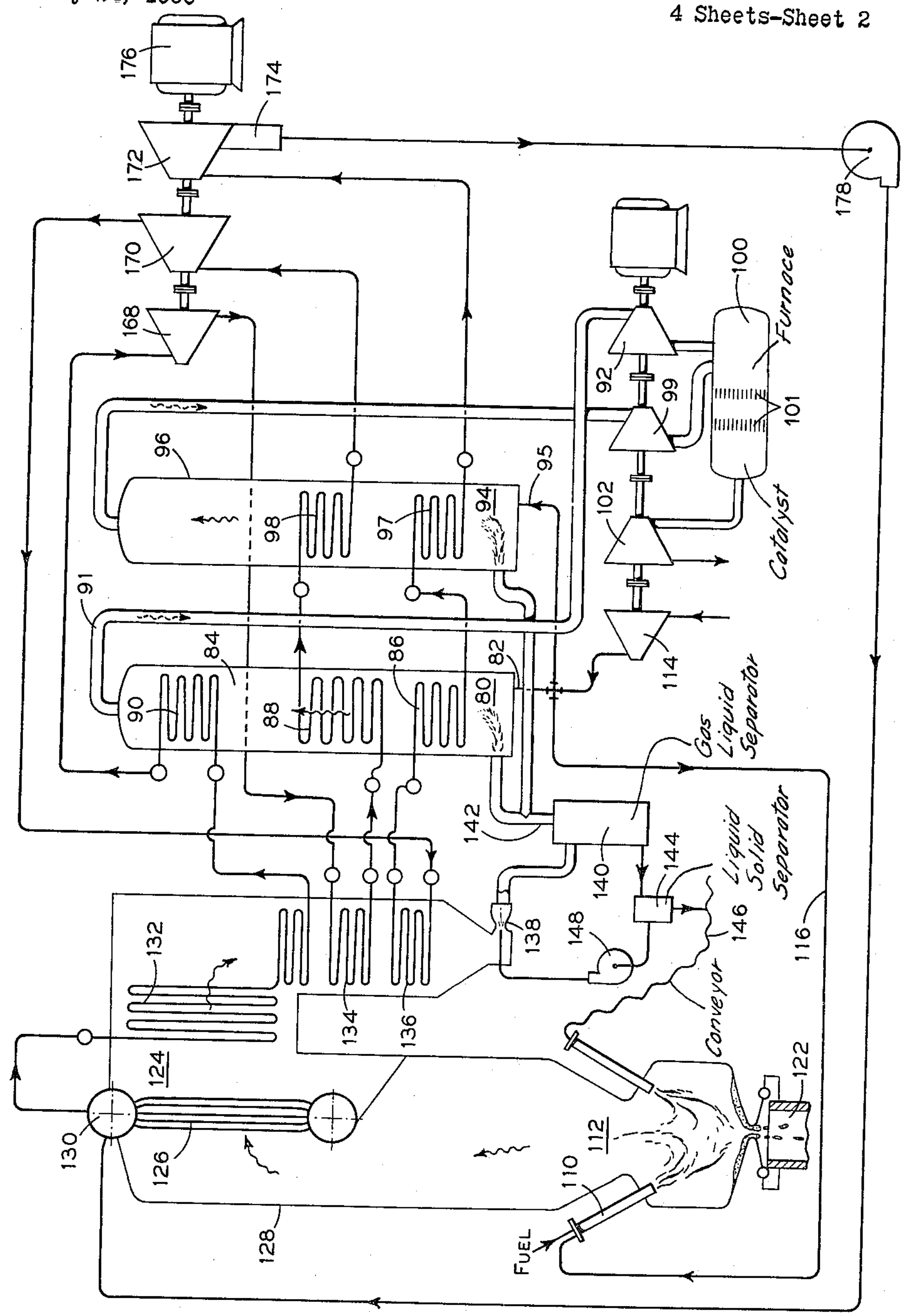
FIG. 2 is an alternative embodiment of a combined fluid power cycle.

The schematic arrangement of the power cycle shown in FIG. 2 is an alternative to FIG. 1 wherein a reheat gas turbine cycle is superimposed on a reheat steam cycle. The gas generator portion of this figure is identical in apparatus and function to that shown in FIG. 1 and those portions which are the same or have similar function will be designated by the same numerals with the prefix 1. Thus, a slag forming fuel is fired by a burner 110 into the furnace chamber 112 wherein it is mixed with a supply of free oxygen-containing gas or air from line 116 in a fuel-oxygen ratio insufficient to complete the combustion of the fuel and to produce a combustible gas, heavy in carbon monoxide. The combustion takes place above the ash fusion temperature of the fuel with the slag being separated, collected, and discharged into the slag tank 122 and the gas, containing entrained solids of unburned fuel solidified ash, and vaporized ash, will pass into a cooling pass 124 which contains the steam generating sections 128 and 126, the primary or low vapor temperature superheater 132, the low temperature portion of the first reheater 134 and the low temperature portion of the second reheater 136, before passing into the scrubbing venturi 138. Therein the dirty combustible gas is washed clean by the liquid in the gas cleaning system containing the separators 140, 144, and the pump 148 as above described, with the separated cinders and solids being returned by the conveying means 146 to the furnace 112. The clean combustible gas is then delivered to the line 142 where it is divided into two separate streams.

One stream passes into a second reaction zone or furnace 80 wherein it is mixed with a quantity of free oxygen-containing gas or air, from the compressor 114 via the line 82, and the gas is burned at a fuel-oxygen ratio insufficient to complete combustion and to produce a lean combustible gas mixture. The gas is then cooled in a second gas pass 84 by the heat transfer surface disposed therein. This heat transfer surface is the first high temperature portion 86 of the second reheater, a first high temperature portion 88 of the first reheater and the high temperature or secondary superheater 90. The gas then passes into an outlet line 91 whence it flows into a high pressure gas turbine 92.

The second of the divided gas streams passes into a third reaction zone or furnace 94 where it is mixed with a quantity of free oxygen-containing gas or air sufficient to completely burn the clean combustible gas and to also contain enough oxygen to fully oxidize the gas leaving the second pass 84. This air is supplied from the line 95. The resulting gas is then passed through a third gas cooling pass 96 wherein it passes over cooling heat transfer surface to be reduced to a predetermined temperature. These heat transfer surfaces comprise a second high temperature portion 97 of the second reheater and the second high temperature portion 98 of the first reheater. The gas then flows into a second gas turbine 99. A fourth reaction zone furnace 100 receives the lean combustible gas from the turbine 92 and the excess oxygen gas from the turbine 99. These pass over catalytic elements 101 which catalyze the combustion of the gases exothermically and reheat the gas before passing it into a reheat gas turbine 102. The catalyst in this gas may be any of the group of combustion catalyst, such as platinum, actinium, titanium and other well known types of low temperature catalyst for the oxidation of hydrocarbons.

The reheat steam power extraction portion of the cycle of FIGURE 2 is identical to that shown in FIG. 1 with the high pressure turbine 168 receiving the high pressure steam from the secondary superheater 90 and expanding it to the first reheater. The intermediary pressure turbine 170 receives the reheated steam from the high temperature portion 98 of the first reheater and after expansion discharges the steam to the second reheater. The low pressure turbine 172 receives the reheated steam from the high temperature portion 97 of the secondary reheater and expands the steam to the condenser 174. The power of the turbines is absorbed in an electric generator 176.

Figure 3:
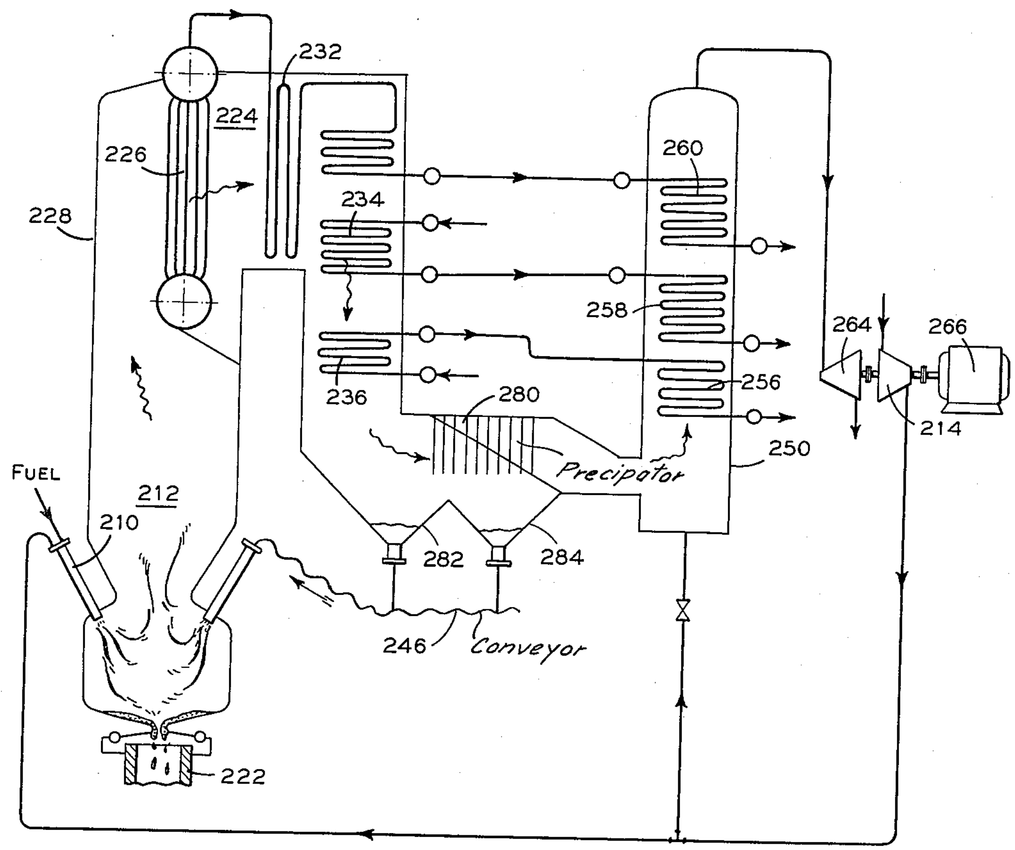
FIG. 3 is a second alternative schematic showing a combined fluid power cycle.

The embodiment of FIG. 3 is similar in function to the embodiment of FIG. 1, therefore, similar performing portions of the apparatus will be given the same numerals with the prefix of 2. The fuel is gasified in the furnace 212 and is then cooled by the steam generator 226 and 228, superheater 232, and reheaters 234 and 236. It is passed into a gas cleaning device 280 which is diagrammatically shown. The gas cleaning device operates both as a mechanical separator for separating out the solid particles carried by the gas and as an electrostatic precipitator. The solid particles are then collected in the two hoppers 282, 284 whence they are passed to the conveying means 246 for reinjection into the furnace. The gas then passes from the gas cleaning device 280 to the second reaction furnace 250 where combustion is completed by the air from the compressor 214, passes over the reheaters 256 and 258 and superheater 266 to the gas turbine 264 as previously described. The gas cleaning means as described in FIG. 3 may be any of the mechanical types of separators such as cyclonic type baffles and other change of direction devices and the electrostatic precipitator may be any of the well known types. Both of these devices are able to operate effectively in this case because the combustible gas has been reduced in temperature in the first heating gas pass to a point where substantially all of the vaporized ash from the combustible gases have been removed and the temperature in the order of 600 F. The reheat steam cycle portion has not been shown to simplify the drawing but the cycle is the same as shown in FIG. 1.

In FIG. 4 there is a third alternative arrangement utilizing the present invention and again the gasifying portion of the apparatus is substantially identical in function with the apparatus described with reference to FIG. 1 and as such each similar element has the same numerical designation with the prefix of 3. The slag containing fuel is fired into the furnace chamber 312 where it burns at a temperature above the ash fusion temperature along with a quantity of free oxygen-containing gas or air supplied by the compressor 314, in a fuel-oxygen ratio insufficient for complete combustion to produce a combustible gas, heavy in carbon monoxide. Molten slag is collected and withdrawn from the furnace as previously described, with the gases containing unburned carbon, solid ash and vaporized inorganic ash products. The gas passes through the first cooling pass 324 wherein it passes over a steam generator 326, superheater 332 and reheaters 334 and 336 heat transfer surface to reduce its temperature to where substantially all vaporized ash products are condensed. From the first cooling pass the gas goes into a gas cleaning device 380 where the gas is exposed to liquid washing, usually by water. The liquid is sprayed from the ring sprayer 382 on to a liquid surface expanding device 384, which may be any of the well known types such as Raschig rings, ceramic fillers, bubble trays and/or open trays. The liquid absorbs the gaseous constituents, such as sulphur oxides, and entrains the solid particles, such as slag and ash, and is collected in a lower portion 386 in the cleaning device. The liquid is then cleaned of solids in the manner described with reference to FIG. 1 in the solid-liquid separator 344. The liquid is then recycled by the pump 348 and the solids are transported by the conveying means 346 into the furnace 312.

The scrubbed or cleaned combustible gas leaves the cleaning device by the line 388 and passes into a regenerative gas heater 390 which is placed in the first cooling gas pass 324 whereby the gas inside the tubes is heated. It then passes into a second reaction zone or furnace 350 where it is combined with a sufficient quantity of free oxygen-containing gas or air from the compressor 314, to complete the combustion. This combustion is low temperature and is accomplished by catalytic action from a series of catalysts 392 positioned in the furnace. The combustion catalysts may be any of the aforementioned ones. The reheated gases leave the furnace 350 at a predetermined temperature and pass through the gas turbine 364 wherein power is extracted. The excess power of the gas turbine is absorbed by the electric generator 366.

The reheat steam power cycle apparatus has not been shown in FIGURE 4 as it is repetitious of the arrangement of FIG. 1. It is intended however that the apparatus of FIG. 4 may be used with a double reheat cycle.

In the gas generating portion of the invention, the vaporized ash products are removed by merely reducing the temperature of the combustible gases to a value of approximately 600 F., or in any event to a value lower than any temperature which would exist in the gas turbines associated with the cycle. In this way two advantages are gained. First there is assurance that none of the vaporized ash will deposit in the turbine and thus have a deleterious effect therein and second this temperature is low enough to allow gas cleaning equipment to be used to remove the objectionable solids and harmful gases from the combustion products. Consequently, when the combustible gases are completely burned in the second reaction zone, there results clean high temperature gases which may be used in the gas turbine cycle with complete confidence that the turbine will not be subject to corrosion, erosion and/or deposition. By virtue of this arrangement and the control of the percentage of the combustible products in the gas, the temperature of the gas entering the turbine may be made as high as 2000 F., while utilizing presently known materials of construction.

In the operation of the gas generator the gasification of the fuel should produce combustible gas having the following typical analysis:

| | Percent by volume |
|---|---|
| Carbon dioxide | 8.0 |
| Hydrogen | 6.5 |
| Carbon monoxide | 16.5 |
| Nitrogen | 69.0 |

In the second stage reaction zone 80 of FIG. 2 the lean gas resulting from the partial combustion of the gas should produce gas having the following typical analysis:

| | Wet, percent | Dry, percent |
|---|---|---|
| Carbon dioxide | 14.0 | 15.0 |
| Hydrogen | 2.0 | 2.0 |
| Carbon monoxide | 6.0 | 7.0 |
| Nitrogen | 69.0 | 76.0 |
| Water | 9.0 | |
| Total | 100.0 | 100.0 |

Although water has been described as the typical washing liquid used in the gas cleaning system, other liquids may be effectively used depending on the products to be removed from the gas. Oil may be used because of its propensity for entrapping small sized solid particles. An alkali liquid may also be used to neutralize the acid forming sulphur oxide in the combustion gas.

The present invention contemplates that heavy distillate fuel oils, such as number 6 oil, may be used advantageously in the present invention. The oil is gasified to produce a combustible gas mixture having entrained solids and vaporized ash products. The gas is cooled to condense the vaporized ash products and then is cleaned to remove the solids. Thereafter, the combustible gas is burned to produce a predetermined inlet gas temperature for the gas turbine. This arrangement of gas generation for a gas turbine cycle becomes more attractive when superimposed upon a steam cycle where the advantages of both cycles can be combined to produce a high plant thermal efficiency. Such a plant is particularly adapted for very large power outputs considerably greater than any which can be realized with the gas turbine plant alone.

The factor of having clean high temperature gases available in the gas generator of the present invention makes it advantageous to place the high steam heat transfer surface in the clean gas zone because the surface will not be subject to corrosion, erosion and/or deposition. Accordingly, the material of the heat transfer surface may be used to higher temperature limits to provide a more efficient steam cycle. Concurrently, the heat transfer surface may be arranged for greater heat input per unit area due to the clean gas which results in a lower cost high temperature superheater.

While in accordance with the provisions of the statutes I have illustrated and described herein the best forms of the invention now known to me, those skilled in the art will understand that changes may be made in the form of the apparatus disclosed without departing from the spirit of the invention covered by the claims, and that certain features of the invention may sometimes be used to advantage without a corresponding use of other features.

What is claimed is:

1. In a binary fluid power cycle a process comprising the steps of passing a slag-forming fuel into a first reaction zone, passing a free oxygen-containing gas at superatmospheric pressure into said first reaction zone in a fuel to oxygen ratio insufficient for complete combustion, partially burning said fuel in said first reaction zone at a temperature above the fuel ash fusion temperature to produce gaseous combustible products having entrained solids and vaporized ash products, separating a major portion of the molten ash from said gaseous products in said first reaction zone, withdrawing said molten ash from said first reaction zone, cooling said gaseous products including the vaporized ash and entrained solids in a first cooling zone to condense substantially all of said vaporized ash products removing said entrained and condensed solids from said combustible gaseous products, conveying and injecting the collected solid matter into said first reaction zone, passing the cleaned combustible gaseous products into a second reaction zone, passing a free oxygen-containing gas into said second reaction zone in a fuel to oxygen ratio sufficient to complete combustion, burning said combustible gas in said second zone to produce a clean high temperature superatmospheric pressure gas, passing said clean gas through a second cooling zone to reduce the temperature thereof to a predetermined gas delivery temperature, generating and initially superheating vapor from heat transferred in said first cooling zone, completing the final superheating of said vapor by heat from the clean gaseous products in the second cooling zone, passing said superheated vapor through a vapor power extraction expansion zone, and passing said clean gas through a power extraction expansion process.

2. In a binary fluid power cycle a process comprising the steps of passing a slag-forming fuel into a first reaction zone, passing a free oxygen-containing gas at superatmospheric pressure into said first reaction zone in a fuel to oxygen ratio insufficient for complete combustion, partially burning said fuel in said first reaction zone at a temperature above the fuel ash fusion temperature to produce gaseous combustible products having entrained solid and vaporized ash products, separating a major portion of the molten ash from said gaseous products in said first reaction zone, withdrawing said molten ash from said first reaction zone, cooling said gaseous products including the vaporized ash and entrained solids in a first cooling zone to condense substantially all of said vaporized ash products, removing said entrained and condensed solids from said combustible gaseous products, conveying and injecting the collected solid matters into said first reaction zone passing the cleaned combustible gaseous products into a second reaction zone, passing a free oxygen-containing gas into said second reaction zone in a fuel to oxygen ratio sufficient to complete combustion, burning said combustible gas in said second zone to produce a clean high temperature superatmospheric pressure gas, passing said clean gas through a second cooling zone to reduce the temperature thereof to a predetermined gas delivery temperature, generating and initially superheating vapor from heat transferred in said first cooling zone, completing the final superheating of said vapor by heat from the clean gaseous products in the second cooling zone, passing said superheated vapor through a vapor power expansion zone, passing expanded vapor into said first cooling zone for the initial reheating, completing the reheating of said partially heated vapor by heat from clean gaseous products, passing said reheated steam into a second vapor power extraction expansion zone, passing the vapor from said second vapor power zone into said first cooling zone for the initial portion of the second reheating, completing the second reheating by heat from the clean gaseous products, passing said second reheated vapor into a final vapor expansion power extraction, and passing said clean gas through a power extraction expansion process.

3. In a binary fluid power cycle a process comprising the steps of passing a slag-forming fuel into a first reaction zone, passing a free oxygen-containing gas at superatmospheric pressure into said first reaction zone in a fuel to oxygen ratio insufficient for complete combustion, partially burning said fuel in said first reaction zone at a temperature above the fuel ash fusion temperature to produce gaseous combustible products having entrained solids and vaporized ash products, separating a major portion of the molten ash from said gaseous products in said first reaction zone, withdrawing said molten ash from said first reaction zone, cooling said gaseous products including the vaporized ash and entrained solids in a first cooling zone to condense substantially all of said vaporized ash products, removing said entrained and condensed solids from said combustible gaseous products, conveying and injecting the collected solid matter into said first reaction zone, dividing the cleaned combustible gaseous products into two streams, passing one of said streams into a second reaction zone while concurrently passing the other stream into a third reaction zone, introducing a free oxygen-containing gas at superatmospheric pressure into said second reaction zone to partially burn said gas and produce a lean combustible gas, passing said lean gas through a second cooling zone to reduce the temperature to a predetermined delivery value, passing said cooled lean gas through a first power extraction expansion zone, passing a free oxygen-containing gas at superatmospheric pressure into said third reaction zone to complete the combustion of the combustible gas and provide an excess of free oxygen in the resulting gaseous products sufficient to oxidize the gas issuing from said second reaction zone, passing said gaseous products from said third reaction zone through a third cooling zone to reduce the temperature to a predetermined delivery value, passing said cooled oxidized gaseous products through a second power extraction expansion zone, combining said two gas streams in a fourth reaction zone in the presence of a catalyst to exothermically produce a reheated stream of oxidized gaseous reaction products, passing said combined gas stream through a third power extraction expansion zone, generating and initially superheating vapor from heat transferred in said first cooling zone, completing the final superheating of said vapor by heat from the clean gaseous products in the second cooling zone, passing said superheated vapor through a vapor power extraction expansion zone, passing expanded vapor into said first cooling zone for the initial reheating, completing the reheating of said partially heated vapor by heat from clean gaseous products, and passing said reheated vapor into a second vapor power extraction expansion zone, passing the vapor from said second vapor power zone into said first cooling for the initial portion of the second reheating, completing the second reheating by heat from the clean gaseous products, and passing said second reheated vapor through a third vapor power extraction expansion process.

4. In a binary fluid power cycle a process comprising the steps of passing a slag-forming fuel into a first reaction zone passing a free oxygen-containing gas at superatmospheric pressure into said first reaction zone in a fuel to oxygen ratio insufficient for complete combustion, partially burning said fuel in said first reaction zone at a temperature above the fuel ash fusion temperature to produce gaseous combustible products having entrained solids and vaporized ash products, separating a major portion of the molten ash from said gaseous products in said first reaction zone, withdrawing said molten ash from said first reaction zone, cooling said gaseous products including the vaporized ash and entrained solids in a first cooling zone to condense substantially all of said vaporized ash products, removing said entrained and condensed solids from said combustible gaseous products, conveying and injecting the collected solid matter into said first reaction zone, generating and initially superheating vapor from heat transferred in said first cooling zone, completing the final superheating of said vapor by heat from the clean gaseous products in the second cooling zone, passing said superheated vapor through a vapor power extraction expansion zone, passing the clean gas into said first cooling zone to regeneratively heat said gas, passing said heated gas into a second reaction zone, passing a free oxygen-containing gas into said second reaction zone, burning said clean gas in said second reaction zone in the presence of catalysts to produce a stream of reheated oxidized superatmospheric pressure gaseous products, and passing said clean gas through a power extraction expansion process.

5. A process for producing a clean high temperature gas comprising the steps of passing an ash forming fuel into a first reaction zone, passing a free oxygen-containing gas at superatmospheric pressure into said first reaction zone in a fuel to oxygen ratio insufficient for complete combustion, partially burning said fuel in said first reaction zone to produce gaseous combustible products having entrained solids and vaporized ash products including the vaporized ash, cooling said gaseous products and entrained solids in a first cooling zone to condense substantially all of said vaporized ash products, removing said entrained and condensed solids from said combustible gaseous products, passing the cleaned combustible gaseous products into a second reaction zone, passing a free oxygen-containing gas into said second reaction zone in a fuel to oxygen ratio sufficient to complete combustion, and burning said combustible gas in said second zone to produce a clean high temperature superatmospheric pressure gas.

6. A process for producing a clean high temperature gas comprising the steps of passing an ash forming fuel into a first reaction zone, passing a free oxygen-containing gas at superatmospheric pressure into said first reaction zone in a fuel to oxygen ratio insufficient for complete combustion of all fuel, burning at least some of said fuel in said first reaction zone to produce from all of said fuel gaseous combustible products having entrained solids and vaporized ash products, cooling said gaseous products including the vaporized ash and entrained solids, in a first cooling zone to condense substantially all of said vaporized ash products, removing said entrained and condensed solids from said combustible gaseous products, passing the cleaned combustible gaseous products into a second reaction zone, passing a free oxygen-containing gas into said second reaction zone in a fuel to oxygen ratio sufficient to complete combustion, burning said combustible gas in said second zone to produce a clean high temperature superatmospheric pressure gas, and passing said clean gas through a second cooling zone to reduce the temperature thereof to a predetermined gas delivery temperature.

7. A process for producing a clean high temperature gas comprising the steps of passing a slag-forming fuel into a first reaction zone, passing a free oxygen-containing gas at superatmospheric pressure into said first reaction zone in a fuel to oxygen ratio insufficient for complete combustion, partially burning said fuel in said first reaction zone at a temperature above the fuel ash fusion temperature to produce gaseous combustible products having entrained solids and vaporized ash products, separating a major portion of the molten ash from said gaseous products in said first reaction zone, withdrawing said molten ash from said first reaction zone, cooling said gaseous products including the vaporized ash and entrained solids in a first cooling zone to condense substantially all of said vaporized ash products, removing said entrained and condensed solids from said combustible gaseous products, passing the cleaned combustible gaseous products into a second reaction zone, passing a free oxygen-containing gas into said second reaction zone in a fuel to oxygen ratio sufficient to complete combustion, and burning said combustible gas in said second zone to produce a clean high temperature superatmospheric pressure gas.

8. A process for producing a clean high temperature gas comprising the steps of passing a slag-forming fuel into a first reaction zone, passing a free oxygen-containing gas at superatmospheric pressure into said first reaction zone in a fuel to oxygen ratio insufficient for complete combustion, partially burning said fuel in said first reaction zone at a temperature above the fuel ash fusion temperature to produce gaseous combustible products having entrained solids and vaporized ash products, separating a major portion of the molten ash from said gaseous products in said first reaction zone, withdrawing said molten ash from said first reaction zone, cooling said gaseous products including the vaporized ash and entrained solids in a first cooling zone to condense substantially all of said vaporized ash products, removing said entrained and condensed solids from said combustible gaseous products, conveying and injecting the collected solid matter into said first reaction zone, passing the cleaned combustible gaseous products into a second reaction zone, passing a free oxygen-containing gas into said second reaction zone in a fuel to oxygen ratio to complete combustion, and burning said combustible gas in said second zone to produce a clean high temperature superatmospheric pressure gas.

9. A process for producing a clean high temperature gas comprising the steps of passing a slag-forming fuel into a first reaction zone, passing a free oxygen-containing gas at superatmospheric pressure into said first reaction zone in a fuel to oxygen ratio insufficient for complete combustion, partially burning said fuel in said first reaction zone at a temperature above the fuel ash fusion temperature to produce gaseous combustible products having entrained solids and vaporized ash products, separating a major portion of the molten ash from said gaseous products in said first reaction zone, withdrawing said molten ash from said first reaction zone, cooling said gaseous products including the vaporized ash and entrained solids in a first cooling zone to condense substantially all of said vaporized ash products, removing said entrained and condensed solids from said combustible gaseous products, conveying and injecting the collected solid matter into said first reaction zone, passing the cleaned combustible gaseous products into a second reaction zone, passing a free oxygen containing gas into said second reaction zone in a fuel to oxygen ratio sufficient to complete combustion, burning said combustible gas in said second zone to produce a clean high temperature superatmospheric pressure gas, and passing said clean gas through a second cooling zone to reduce the temperature thereof to a predetermined gas delivery temperature.

10. A process for producing a clean high temperature gas comprising the steps of passing a slag-forming fuel into a first reaction zone, passing a free oxygen-containing gas at superatmospheric pressure into said first reaction zone in a fuel to oxygen ratio insufficient for complete combustion to produce a reducing condition, partially burning said fuel in said first reaction zone at a temperature above the fuel ash fusion temperature to produce gaseous combustible products having entrained solids and vaporized ash products, cooling said gaseous products in a first cooling zone, removing said entrained solids from said combustible gaseous products, passing the combustible gaseous products into a second reaction zone, passing a free oxygen-containing gas into said second reaction zone in a fuel to oxygen ratio sufficient to complete combustion, burning said combustible gas in said second zone to produce a clean high temperature superatmospheric pressure gas, passing said clean gas through a second cooling zone to reduce the temperature thereof to a predetermined gas delivery temperature, generating and initially superheating vapor from heat transferred in said first cooling zone under the reducing conditions, and completing the final superheating of said vapor by heat from the clean gaseous products in the second cooling zone.

11. A process for producing a clean high temperature gas comprising the steps of passing an ash forming fuel into a first reaction zone, passing a free oxygen-containing gas at superatmospheric pressure into said first reaction zone in a fuel to oxygen ratio insufficient for complete combustion, partially burning said fuel in said first reaction zone to produce gaseous combustible products having entrained solids and vaporized ash products including the vaporized ash, cooling said gaseous products and entrained solids in a first cooling zone to condense substantially all of said vaporized ash products, removing said entrained and condensed solids from said combustible gaseous products, passing the clean gas into said first cooling zone to regeneratively heat said gas, passing said heated gas into a second reaction zone, passing a free oxygen-containing gas into said second reaction zone, and burning said clean gas in said second reaction zone in the presence of catalysts to produce a stream of reheated oxidized superatmospheric pressure gaseous products.

12. A process for producing a clean high temperature gas comprising the steps of passing a slag-forming fuel into a first reaction zone, passing a free oxygen-containing gas at superatmospheric pressure into said first reaction zone in a fuel to oxygen ratio insufficient for complete combustion, partially burning said fuel in said first reaction zone at a temperature above the fuel ash fusion temperature to produce gaseous combustible products having entrained solids and vaporized ash products, separating a major portion of the molten ash from said gaseous products in said first reaction zone, withdrawing said molten ash from said first reaction zone, cooling said gaseous products including the vaporized ash and entrained solids in a first cooling zone to condense substantially all of said vaporized ash products, removing said entrained and condensed solids from said combustible gaseous products, conveying and injecting the collected solid matter into said first reaction zone, passing the clean gas into said first cooling zone to regeneratively heat said gas, passing said heated gas into a second reaction zone, passing a free oxygen-containing gas into said second reaction zone, and burning said clean gas in said second reaction zone in the presence of catalysts to produce a stream of reheated oxidized superatmospheric pressure gaseous products.

13. In an elastic fluid power plant, walls forming a first furnace for the burning of a slag forming fuel above the ash fusion temperature and the separation of molten slag from the resulting gas, means introducing a slag-forming fuel and free oxygen-containing gas into said first furnace in a fuel-oxygen ratio insufficient for complete combustion to produce gaseous combustible products having entrained solid and vaporized ash products, means for collecting and withdrawing molten slag from said first furnace, a gas pass having its inlet opening into said first furnace, heat transfer surface arranged as a bank of tubes in said pass having a sufficient cooling capacity to cool the gas to condense substantially all of said vaporizable ash products, gas cleaning means arranged to receive and clean the solids from said gaseous combustible products from said gas pass, walls forming a second furnace chamber having a combustible gas inlet in communication with said gas cleaning means, means introducing a free oxygen-containing gas into said second furnace to complete the combustion and produce a clean high temperature gas, and a gas turbine arranged to receive the clean high temperature gas.

14. In an elastic fluid power plant, walls forming a first furnace for the burning of a slag forming fuel above the ash fusion temperature and the separation of molten slag from the resulting gas, means introducing a slag-forming fuel and free oxygen-containing gas into said first furnace in a fuel-oxygen ratio insufficient for complete combustion to produce gaseous combustible products having entrained solids and vaporized ash products, means for collecting and withdrawing molten slag from said first furnace, a gas pass having its inlet opening into said first furnace, heat transfer surface arranged as a bank of tubes in said pass having a sufficient cooling capacity to cool the gas to condense substantially all of said vaporizable ash products, gas cleaning means arranged to receive and clean the solids from said gaseous combustible products from said gas pass, means for conveying and injecting the solid material cleaned from said gas into said first furnace, walls forming a second furnace chamber having a combustible gas inlet in communication with said gas cleaning means, means introducing a free oxygen-containing gas into said second furnace to complete the combustion and produce a clean high temperature gas, a gas turbine arranged to receive the clean high temperature gas, said heat transfer surface in said first cooling pass including means for generating and superheating vapor, and a vapor turbine arranged to receive the superheated vapor.

15. In a gas generator, walls forming a first furnace for the burning of slag-forming fuel above the ash fusion temperature and the separation of molten slag from the resulting gas, means introducing a slag-forming fuel and free oxygen-containing gas into said first furnace in a fuel-oxygen ratio insufficient for complete combustion to produce gaseous combustible products having entrained solids and vaporized ash products, means for collecting and withdrawing molten slag from said first furnace, a gas pass having its inlet opening into said first furnace, heat transfer surface arranged as a bank of tubes in said pass having a sufficient cooling capacity to cool the gas to condense substantially all of said vaporizable ash products, gas cleaning means arranged to receive and clean the solids from said gaseous combustible products from said gas pass, walls forming a second furnace chamber having a combustible gas inlet in communication with said gas cleaning means, and means introducing a free oxygen-containing gas into said second furnace to complete the combustion and produce a clean high temperature gas.

16. In a gas generator, walls forming a first furnace for the burning of a slag-forming fuel above the ash fusion temperature and the separation of molten slag from the resulting gas, means introducing a slag-forming fuel and free oxygen-containing gas into said first furnace in a fuel-oxygen ratio insufficient for complete combustion to produce gaseous combustible products having entrained solids and vaporized ash products, means for collecting and withdrawing molten slag from said first furnace, a gas pass having its inlet opening into said first furnace, heat transfer surface arranged as a bank of tubes in said pass to cool the gas to condense substantially all of said vaporizable ash products, gas cleaning means arranged to receive and clean the solids from said gaseous combustible products from said gas pass, means for conveying and injecting the solid material cleaned from said gas into said said first furnace, walls forming a second furnace chamber having a combustible gas inlet in communication with said gas cleaning means, and means introducing a free oxygen-containing gas into said second furnace to complete the combustion and produce a clean high temperature gas.

17. In a gas generator, walls forming a first furnace for the burning of a slag-forming fuel above the ash fusion temperature and the separation of molten slag from the resulting gas, means introducing a slag-forming fuel and free oxygen-containing gas into said first furnace in a fuel-oxygen ratio insufficient for complete combustion to produce gaseous combustible products having entrained solids and vaporized ash products, means for collecting and withdrawing molten slag from said first furnace, a gas pass having its inlet opening into said first furnace, heat transfer surface arranged as a bank of tubes in said pass to cool the gas to condense substantially all of said vaporizable ash products, gas cleaning means arranged to receive and clean the solids from said gaseous combustible products from said gas pass, walls forming a second furnace chamber having a combustible gas inlet in communication with said gas cleaning means, means introducing a free oxygen-containing gas into said second furnace to complete the combustion and produce a clean high temperature gas, a second gas pass arranged to receive the gas from said second furnace, and heat transfer surface in said second pass arranged to reduce the temperature of said clean gas to a predetermined delivery temperature.

18. In a vapor generating unit, walls forming a first furnace for the burning of a slag forming fuel above the ash fusion temperature and the separation of molten slag from the resulting gas, means introducing a slag-forming fuel and free oxygen-containing gas into said first furnace in a fuel-oxygen ratio insufficient for complete combustion to produce gaseous combustible products having entrained solids and vaporized ash products, means for collecting and withdrawing molten slag from said first furnace, a gas pass having its inlet opening into said first furnace, heat transfer surface arranged as a bank of tubes in said pass to cool the gas to condense substantially all of said vaporizable ash products, gas cleaning means arranged to receive and clean the solids from said gaseous combustible products from said gas pass, means for conveying and injecting the solid material cleaned from said gas into said first furnace, walls forming a second furnace chamber having a combustible gas inlet in communication with said gas cleaning means, means introducing a free oxygen-containing gas into said second furnace to complete the combustion and produce a clean high temperature gas, a second gas pass arranged to receive the gas from said second furnace, heat transfer surface in said second pass arranged to reduce the temperature of said clean gas to a predetermined delivery temperature, said heat transfer surface in said first cooling pass including means for generating and superheating vapor and low vapor temperature reheating means, the heat transfer surface in said second gas pass including a high vapor temperature superheater arranged to further superheat the vapor superheated in said first gas pass, and a high vapor temperature reheating means arranged to further heat the vapor reheated in said first gas pass.

19. In a gas generator, walls forming a first furnace for burning of a slag forming fuel above the ash fusion temperature and the separation of molten slag from the resulting gas, means introducing a slag-forming fuel and a free oxygen-containing gas into said first furnace in a fuel-oxygen ratio insufficient for complete combustion to produce gaseous combustible products having entrained solids and vaporized ash products, means for collecting and withdrawing molten slag from said first furnace, a gas pass having its inlet opening into said first furnace, heat transfer surface arranged as a bank of tubes in said pass to cool the gas to condense substantially all of said vaporizable ash products, gas cleaning means arranged to receive and clean the solids from said gaseous combustible products from said gas pass, means for conveying and injecting the solid material cleaned from said gas into said first furnace, conduit means receiving gas from said gas cleaning means and arranged to divide the clean combustible gaseous products into two parallel flowing streams, walls forming a second furnace chamber adapted to receive one of said streams of clean combustible gas, means introducing a free oxygen-containing gas into said second furnace to partially burn said gas and produce a lean high temperature combustible gas, a second cooling gas pass arranged to receive the lean gas from said second furnace, heat transfer surface in said second gas pass adapted to reduce the temperature of said gas to a predetermined delivery temperature, walls forming a third furnace chamber receiving said other stream of combustible gas from said conduit means, means introducing a free oxygen-containing gas into said third furnace to complete the combustion of the combustible gas and provide an excess of free oxygen in the resulting gas products sufficient to oxidize all of the combustible gas flowing into said second furnace chamber, a third gas pass communicating with said third furnace, heat transfer surface in said third gas pass to reduce the temperature of the gases flowing therein to a predetermined delivery value.

20. In a gas generator, walls forming a first furnace, means introducing a fuel and free oxygen-containing gas into said first furnace in a fuel-oxygen ratio insufficient for complete combustion to produce gaseous combustible products having entrained solids and vaporized ash products, a gas pass having its inlet opening into said first furnace, heat transfer surface arranged as a bank of tubes in said pass having a sufficient cooling capacity to cool the gas to condense substantially all of said vaporizable ash products, gas cleaning means arranged to receive and clean the solids from said gaseous combustible products from said gas pass, and a gas heating surface in said first gas pass arranged to regeneratively heat the combustible gas from said gas cleaning means.

21. In a gas generator, walls forming a first furnace for the burning of a slag forming fuel above the ash fusion temperature and the separation of molten slag from the resulting gas, means introducing a slag-forming fuel and free oxygen-containing gas into said first furnace in a fuel-oxygen ratio insufficient for complete combustion to produce gaseous combustible products having entrained solids and vaporized ash products, means for collecting and withdrawing molten slag from said first furnace, a gas pass having its inlet opening into said first furnace, heat transfer surface arranged as a bank of tubes in said pass having a sufficient cooling capacity to cool the gas to condense substantially all of said vaporizable ash products, gas cleaning means arranged to receive and clean the solids from said gaseous combustible products from said gas pass, means for conveying and injecting the material cleaned from said gas into said first furnace, and a gas heating surface in said first gas pass arranged to regeneratively heat the combustible gas from said gas cleaning means.

22. In a gas generator, walls forming a first furnace for the burning of a slag forming fuel above the ash fusion temperature and the separation of molten slag from the resulting gas, means introducing a slag-forming fuel and free oxygen-containing gas into said first furnace in a fuel-oxygen ratio insufficient for complete combustion to produce gaseous combustible products having entrained solids and vaporized ash products, means for collecting and withdrawing molten slag from said first furnace, a gas pass having its inlet opening into said first furnace, heat transfer surface arranged as a bank of tubes in said pass to cool the gas to condense substantially all of said vaporizable ash products, gas cleaning means arranged to receive and clean the solids from said gaseous combustible products from said gas pass, means for conveying and injecting the material cleaned from said gas into said first furnace, a gas heating surface in said first gas pass arranged to regeneratively heat the combustible gas from said gas cleaning means, walls forming a second furnace chamber adapted to receive the gas from said gas heating surface, and means introducing a free oxygen containing gas into said second reaction zone for the combustion of said gas.

23. In a vapor generating unit, walls forming a first furnace, means introducing a fuel and free oxygen-containing gas into said first furnace in a fuel-oxygen ratio insufficient for complete combustion to produce gaseous combustible products having entrained solids and vaporized ash products, a gas pass having its inlet opening into said first furnace, heat transfer surface arranged as a bank of tubes in said pass having a sufficient cooling capacity to cool the gas to condense substantially all of said vaporizable ash products, said heat transfer surface in said first cooling pass including means for generating and superheating vapor, gas cleaning means arranged to receive and clean the solids from said gaseous combustible products from said gas pass, walls forming a second furnace chamber having a combustible gas inlet in communication with said gas cleaning means, means introducing a free oxygen-containing gas into said second furnace to compete the combustion and produce a clean high temperature gas, and a second gas pass arranged to receive gas from said second furnace, heat transfer surface in said second pass arranged to reduce the temperature of said clean gas to a predetermined delivery temperature, the heat transfer surface in said second gas pass including a high vapor temperature superheater arranged to further superheat the vapor superheated in said first gas pass.

References Cited in the file of this patent

UNITED STATES PATENTS

| | | |
|---|---|---|
| 2,187,627 | Noack | Jan. 16, 1940 |
| 2,263,433 | Allen | Nov. 18, 1941 |
| 2,443,841 | Sweeney et al. | June 22, 1948 |
| 2,592,749 | Sedille et al. | Apr. 15, 1952 |
| 2,653,443 | Mercier et al. | Sept. 29, 1953 |
| 2,701,443 | Sedille | Feb. 5, 1955 |
| 2,777,288 | Glinka | Jan. 15, 1957 |
| 2,853,059 | Craig | Sept. 23, 1958 |

FOREIGN PATENTS

| | | |
|---|---|---|
| 271,899 | Great Britain | Aug. 18, 1927 |
| 675,583 | Great Britain | July 16, 1952 |
| 683,823 | Great Britain | Dec. 3, 1952 |

OTHER REFERENCES

"The Oil Engine and Gas Turbine," vol. XIX, Issue 216, June 1951, pages 62–66; published by Temple Press Limited, London, England.